(12) United States Patent
Fourty et al.

(10) Patent No.: US 6,348,536 B1
(45) Date of Patent: Feb. 19, 2002

(54) LAMELLAR FILLER PROCESS FOR THE TREATMENT OF POLYMERS

(75) Inventors: Georges Fourty; Frédéric Jouffret; Patrice Monnot, all of Toulouse (FR)

(73) Assignee: Talc de Luzenac, Luzenac (FR)

( * ) Notice: Subject to any disclaimer, the term of this patent is extended or adjusted under 35 U.S.C. 154(b) by 0 days.

(21) Appl. No.: 09/402,319

(22) PCT Filed: Mar. 20, 1998

(86) PCT No.: PCT/FR98/00569

§ 371 Date: Oct. 4, 1999

§ 102(e) Date: Oct. 4, 1999

(87) PCT Pub. No.: WO98/45374

PCT Pub. Date: Oct. 15, 1998

(30) Foreign Application Priority Data

Apr. 4, 1997 (FR) .............................................. 97 04308

(51) Int. Cl.$^7$ ................................................. C08K 3/00
(52) U.S. Cl. ........................ 524/451; 106/415; 106/469
(58) Field of Search .......................... 524/451; 106/415, 106/469

(56) References Cited

FOREIGN PATENT DOCUMENTS

| JP | 62-072739 | 4/1987 |
|----|-----------|--------|
| WO | WO 95/17998 | 7/1995 |
| WO | WO 96/24639 | 8/1996 |
| WO | WO 97/02323 | 1/1997 |
| WO | WO 97/12002 | 4/1997 |

OTHER PUBLICATIONS

W. Hohenberger et al., "Fillers", *Kunststoffe*, vol. 86, No. 7, Jul., 1996, pp. 973–977.

W. Schober, "Talc For Thermoplastics", *Industrial Minerals*, May, 1995, pp. 47–53.

L.J. Michot et al., "Multistage Wet Grinding of Talc: Relation Between Physico–Chemical Parameters of the Filler and Mechanical Properties of Filled Polypropylenes", *Journal of Materials Science*, vol. 28, No. 7, 1993, pp. 1856–1866.

G. Baudet et al., "Comparaison de Methodes d'analyses Granulometriques, Application du Granulometre a Laser a la Determination du Coefficient de forme des Particules", *Industie Minerale—Mines et Carrieres—Les Techniquies*, 1990, pp. 55–61.

Primary Examiner—Edward J. Cain
(74) Attorney, Agent, or Firm—Young & Thompson

(57) ABSTRACT

A process for treating a lamella-type mineral in the form of particles constituted of stacks of sheets, in order to obtain a functional filler for a polymer material. The mineral is suspended in a liquid with a predetermined initial particle size, after which the suspension is subjected to a delamination procedure in order to separate the sheet from the particles, and obtain a particle size smaller than the initial particle size. The suspension is then subjected to selection in order to eliminate the particles larger in size than the predetermined size; it is subsequently dried, and the mineral particles are treated so as to restrict the creation amongst them of strong irreversible bonds. The talcum powder obtained can be incorporated into a thermoplastic material as a functional filler in order to increase the flexural modulus in proportions significantly higher than what is obtained with known fillers, without diminishing the shock resistance of the final material (with respect to the values obtained with said known fillers).

23 Claims, No Drawings

LAMELLAR FILLER PROCESS FOR THE TREATMENT OF POLYMERS

CROSS REFERENCE TO RELATED APPLICATION

This is the 35 USC 371 national stage of International application PCT/FR98/00569 filed on Mar. 20, 1998, which designated the United States of America.

FIELD OF THE INVENTION

The invention concerns a process for treating a lamellar type mineral (i.e. of which the structure consists of a stack of elementary leaves), with a view to obtaining a powder with a high lamellarity. It concerns in particular the manufacture of talc, kaolin or mica powders, having at the same time a fine or very fine particle size and a high lamellarity. It extends to applications for the said powders as functional fillers for thermoplastic materials with a view to increasing the modulus of elasticity in flexure of these materials for a given impact resistance. "Functional filler" is understood to mean an additive incorporated in the thermoplastic material with a view to increasing its performances (as against a "passive filler" which modifies the properties of the plastic material obtained very little and essentially serves to reduce the cost).

BACKGROUND OF THE INVENTION

It is now current practice to incorporate mineral fillers into thermoplastic materials in the form of powders, such as talc, kaolin or mica powders with a view to increasing the modulus of elasticity in flexure. (This modulus of elasticity in flexure is defined by the "ISO 178" standard which describes the procedure for measuring this modulus. All the measurements of the said modulus which are provided hereinafter were carried out according to this standard.) This increase in the modulus of elasticity in flexure of the material obtained enables the dimensions of parts manufactured from the said material to be reduced and hence to be made lighter for a given rigidity. This reduction in weight is essential in several sectors of industry, in particular in the automobile sector and the packaging sector and it also leads to a reduction in costs.

At the present time, mineral powders which are incorporated in thermoplastic materials are fine powders. For talc in particular, the mean particle size is generally between 2 and 10 microns and is obtained by dry grinding and selection, in particular in installations of the "air or steam micronizer" type where the mineral is ground and selected dry. In order to increase the value of the modulus of elasticity in flexure still further, it is proposed in several publications to reduce the particle size of the powders used (cf. for example "W. Hobenberger, Fillers, Kunststoffe plast Europe 86, Jul. 7, 1996, pp 973–977"; "De Wilhelm Schober, Talc for thermoplastics, Industrial minerals, May 1995, pp 49–53"). The consistent idea of associating the modulus of elasticity in flexure of the final material obtained with the particle size of the filler is currently generalized in the field of functional fillers for thermoplastics, and those working in the field are engaged in improving the dry grinding and selection techniques in order to obtain increasingly fine powders (the dry grinding and selection techniques being in point of fact known for the purpose of obtaining fine particle sizes industrially).

Another type of grinding also exists, known as wet grinding, consisting of suspending the mineral in a liquid and of stirring it in the presence of a ball milling charge. This wet grinding technique is generally used for grinding and homogenizing paints or for grinding mineral fillers in the paper industry. For example, WO/9712002 and WO/9624639 describe pigments for paper pulp having been subjected to wet grinding which enables the optical properties of the papers obtained to be improved. The grinding efficiency is measured by the D.I. obtained ("Delamination Index": difference between a particle size characteristic of the finished product and a particle size characteristic of the product subject to grinding). It should be emphasized that this DI index does not intrinsically characterize a powder but an operation used, in terms of particle size.

Studies have been carried out in the field of thermoplastic materials to evaluate the value of using this type of wet grinding technique for functional mineral fillers to be incorporated in plastic materials, but these studies have resulted in a negative conclusion. Although the modulus of elasticity in flexure may be increased (for an equivalent particle size) by using wet grinding, this wet grinding technique leads on the other hand to an unacceptable defect in the manufacture of plastic materials, namely a considerable reduction in the impact resistance of the plastic material obtained. (The impact resistance referred to in all the following text is the un-notched CHARPY impact resistance at –20° C. measured according to the "ISO 179" standard). Reference may for example be made to the following publication which refers to these wet grinding tests for manufacturing mineral fillers for thermoplastic materials: "L. J. Michot et al., Journ. Mater. Sci. (1993), 28 (7) pp 1856–66".

The state of the prior art in the field of functional mineral fillers which can be incorporated in thermoplastic materials is therefore currently as follows:

- on the one hand, wet grinding has never been used industrially, taking into account the problems of impact resistance which it entails (except for fillers essentially based on mica with a view to producing parts which require only very low impact resistances),
- on the other hand, the route taken by industrial development in order to increase the modulus of elasticity in flexure of the final material consists of refining the particle size of mineral powders used as fillers, by improving the dry grinding techniques for these powders.

SUMMARY OF THE INVENTION

The object of the present invention is to provide a novel mineral powder, in particular talc, kaolin or mica, suitable for incorporation as a functional filler in a thermoplastic material with a view to increasing the modulus of elasticity in flexure thereof in significant proportions higher than that obtained with known fillers and this without reducing the impact resistance of the final material (compared with the values obtained with the said known fillers).

"Powder" is understood to mean an uncompacted product in which the particles are free to move in relation to each other, as well as a densified product where the particles or certain particles are temporarily bound in agglomerates.

The mineral powder to which the invention relates is in particular a talc, kaolin or mica powder, and is characterized by:

a particle size distribution such that the median diameter of the particles $D_{50}$ lies substantially between 0.5 and 5 microns, the cutoff diameter $D_{95}$ is less than 10 microns, and the cutoff diameter $D_{98}$ is less than 20 microns, a specific surface area (BET) greater than 10 m²/g,
a high lamellarity index greater than 2.8 and preferably greater than 4.

"Median diameter $D_{50}$" is understood to mean a diameter such that 50% of the particles by weight have a size less than the said diameter; "cutoff diameter $D_{95}$" is understood to mean a diameter such that 95% by weight of the particles have a size less than the said diameter; "cutoff diameter $D_{98}$" is understood to mean a diameter such that 98% by weight of the particles have a size less than the said diameter. For non-spherical particles, the size consists of the equivalent spherical diameter (Stocks diameter). All measurements of the diameters $D_{50}$, $D_{95}$, $D_{98}$ were carried out by means of a "Sedigraph" apparatus (trade name) by gravity sedimentation in accordance with standard AFNOR X11-683.

"Specific surface area (BET)" is understood to mean the area of the surface of the particles of the powder with respect to unit mass, determined according to the BET method by the quantity of argon adsorbed on the surface of the said particles so as to form a monomolecular layer completely covering the said surface (measurement according to the BET method, AFNOR standard X 11-621 and 622).

"The lamellarity index" characterizes the shape of the particle, and more particularly its flatness (large dimension/thickness). In all the following, this lamellarity index will be measured by the difference between, on the one hand, the value of the mean dimension of the particles of the powder obtained by a particle size measurement by Malvern laser diffraction using a wet method (standard AFNOR NFX11-666) and on the other hand, the value of the mean diameter $D_{50}$ obtained by a measurement by sedimentation using a "Sedigraph" (standard AFNOR X11-683), this difference being related to the mean diameter $D_{50}$. Reference may be made to the article <<G.BAUDET and J. P. RONA, Ind. Min. Mines et Carr. Les techn. June, July 1990, pp 55–61>> which shows that this index is correlated to the mean ratio of the largest dimension of the particle to its smallest dimension.

"High lamellarity" is understood to mean a powder of which the lamellarity index is high and in particular greater than 2.8.

The particle size and lamellarity parameters are assumed to be measured on the elementary particles of which the powder consists. These measurements aimed at the geometry of the particles may be upset by the introduction of additives capable of producing flocculation or agglomeration of the elementary particles (masking these during characterization). Measurements will be taken after possible elimination of these additives so as to revert to the natural form of the powder (all the elementary particles).

The powder according to the invention combines a fine or very fine particle size and a high lamellarity and may be manufactured by the following process:

(a) the mineral with a predetermined initial particle size is suspended in a liquid,
(b) the suspension is subjected to a delamination operation adapted so as to produce a separation of the leaves of the particles and so as to obtain a particle size less than the initial particle size.
(c) the suspension is then subjected to a selection so as to eliminate the particles with a size greater than a predetermined size,
(d) the suspension is dried,
(e) the mineral particles are treated so as to limit the creation of strong irreversible bonds between them.

The mineral, in particular talc, kaolin or mica is preferably chosen having an initial particle size with a median diameter $D_{50}$ greater than 5 microns, the delamination operation leading to a particle size with a median diameter $D_{50}$ less than 5 microns. In addition, selection is in particular carried out in order to eliminate at least 98% of large particles with a diameter greater than 20 microns.

"Lamellar type mineral" is understood to mean a mineral of which the structure consists of a stack of elementary leaves. The process of the invention may in particular be put into operation by using talc as a mineral, and in particular a pre-ground macrocrystalline talc of which the lamellar character is the most pronounced. "Macrocrystalline talc" is understood to mean a talc which naturally contains large elementary crystals (in particular larger than 15 microns) which can be observed on thin lamellars, as against microcrystalline talcs naturally having small size elementary crystals. A pre-ground macrocrystalline talc will advantageously be chosen having a median diameter $D_{50}$ greater than 10 microns.

In all the following text, "talc" is understood either to mean the hydrated magnesium silicate mineral, or the mineral chlorite (hydrated magnesium aluminium silicate), or a mixture of the two, associated optionally with other minerals (dolomite, etc.) or furthermore a mineral substance derived from talc and having similar properties.

"Drying" is understood to mean any operation tending to reduce the quantity of water in the suspension. This drying may in particular be carried out by atomization or granulation-drying.

DETAILED DESCRIPTION OF THE INVENTION

The process of the invention may be implemented according to the following preferred operational method:

The delamination operation is advantageously carried out by grinding, by introducing a grinding charge into the suspension and by creating agitation of the suspension until mineral particles are obtained having a median diameter $D_{50}$ substantially between 0.5 and 5 microns, and a specific surface area (BET) greater than 10 m²/g.

The selection is in particular a hydrodynamic selection carried out so as to obtain a cutoff diameter $D_{95}$ less than microns and a cutoff diameter $D_{98}$ less than 20 microns.

In the grinding operation, the grinding charge consists of "balls", this term being taken in its general meaning of "grinding elements adapted to produce attrition of the solid particles contained in the suspension by agitation", the shape of these elements, generally spherical or spheroidal, not being limiting.

The hydrodynamic selection operation is known in itself and operates by differential sedimentation. It makes it possible to separate particles as a function of their size (in fact of their weight) and to select a desired distribution (in the example $D_{95}$<10 μm and $D_{98}$<20 μm.

Analyses have shown that the powder obtained by putting into practice the process of the invention combines the previously indicated characteristics, namely in summary: a fine or very fine particle size and a high lamellarity. Experiments carried out with the same powder have made it possible to determine, surprisingly, that this produces, when used as a functional filler in a thermoplastic material, a significant increase in the modulus of elasticity in flexure of the final material obtained compared with a known comparable filler (namely of the same chemical nature and having a comparable particle size) and this without a reduction in the impact resistance of the final material. The modulus of elasticity in flexure is generally increased by at least 15% which constitutes a remarkable result, the impact resistance being identical (within the errors of measurement).

The invention is the result of trial and error and tests, which in the first place led to the presumptions of the prior art in favour of the use of increasingly fine powders being called into question. The inventors in particular carried out a test programme manufacturing powders of various particle sizes by dry grinding, extending from fine powders ($D_{50}=5$ $\mu$m) to very fine powders ($D_{50}=0.5$ $\mu$m). They were able to demonstrate that, in fact, the modulus of elasticity in flexure passes through a maximum and then decreases when the fineness of the powder increases, so that it is illusory to undertake to produce increasingly fine powders. Paradoxically, below a certain value an opposite effect is obtained to the one desired.

This discovery led the inventors to abandon the dry grinding technique (the essential value of which is to enable a high degree of fineness to be achieved industrially) and to explore other techniques and in particular the technique of delamination by wet grinding while attempting to overcome the fault which currently prevents this technique from being used, namely a fall in the impact resistance of the plastic materials obtained. The inventors have shown that combining the following treatment operations on the starting material:

delamination in order to obtain a high lamellarity index and a specific particle size distribution (previously defined), selection in order to select a specific fraction (previously defined) of this distribution, drying and treatment of the mineral particles in order to limit the appearance of strong bonds between these, enabled a mineral powder to be obtained which combined a fine particle size distribution of the predefined type and a high lamellarity (greater than 2.8 and generally greater than 4) and led to the previously described performances (increase in the modulus of elasticity in flexure, constancy of the impact resistance) when it was incorporated as a functional filler in a thermoplastic material. This result is difficult to explain at the present time.

It should be noted that the treatment of mineral particles to limit the appearance of strong bonds is imperative. Indeed, delamination of the mineral creates new surfaces which have a tendency to develop bonds (and in particular strong bonds) bringing about the formation of stable agglomerates. It has been possible to demonstrate that these agglomerates bring about a considerable fall in impact resistance if they remain during the incorporation of the powder in the thermoplastic material. By neutralizing strong bonds, the treatment concerned prevents the formation of these agglomerates or makes them spontaneously destructible when they are introduced into a liquid or viscous organic phase. This treatment consists advantageously of adding an additive to the suspension before complete drying which is able to be adsorbed on the surface of the mineral particles. This additive is preferably a compound with hydrophobic carbon chains bearing polar radicals and in particular of the family of amines, silanes, siloxanes, alcohols or acids. These radicals are adsorbed on the surfaces created during delamination of the mineral and neutralize their tendency to develop strong bonds. In order to reduce losses of the additive, this is preferably added to the suspension after hydrodynamic selection before or at the start of drying. The quantity of additive may in particular be between 0.1% and 2% by weight with respect to the weight of mineral.

It should also be emphasized that the starting mineral in the divided state which is subjected to the process of the invention must be relatively coarse ($D_{50}$ greater than 5 microns and preferably greater than 10 microns). In the contrary case it is not possible to succeed in obtaining a powder having a sufficiently high lamellarity index (this index then remaining below 2.8) and the modulus of elasticity in flexure of the final material is not significantly improved compared with that obtained with comparable known mineral fillers.

Preferably, the starting mineral is suspended in water in the presence of a dispersing agent so that the weight of dry matter based on the total weight of suspension is substantially between 10% and 60%.

A homogeneous suspension is thus obtained which is able to undergo the grinding operation (b) under the best conditions.

This grinding operation is advantageously carried out so as to obtain a medium diameter $D_{50}$ of the particles substantially between 1 and 3.5 microns and a specific surface area substantially between 15 and 40 m$^2$/g. Adjustment of the operating conditions for grinding in order to obtain such values is available to a person skilled in the art. These values appear to lead to a greater increase in the modulus of elasticity in flexure when the powder is used as a functional filler.

According to one advantageous embodiment, it is in particular possible to introduce into the suspension balls having a mean diameter substantially between 0.5 and 3 mm, in a quantity such that the volume of balls is between 60% and 90% of the total volume (suspension and balls). The grinding energy may in particular be adjusted to a value of between 200 and 400 kilowatt·hour per tonne, the grinding period being a function of the nature of the powder and its starting particle size, and is adjusted in each case to reach the desired values of the median diameter $D_{50}$ and of the specific surface area.

The hydrodynamic selection operation is preferably carried out while providing recycling of the largest particles rejected to a new grinding operation. This hydrodynamic selection may in particular be carried out in a turbine selector (centrifuging of the suspension in a turbine provided with selection slits) or in a hydrocyclone (creation of a vortex for separation and selection) or in a centrifuge with an endless extraction screw (centrifuging of the suspension in a bowl and separation by extraction screw).

The suspension is advantageously dried in such a way as to reach a residual liquid level below 1% which then enables the powder to be used directly as a functional filler. In practice this residual level will preferably be reduced below 0.5% in order to facilitate this direct use.

In the process of the invention, the powder is preferably prepared in the compacted state so as to be in the form of agglomerates (temporary) of particles which are easier to handle, by choosing a suitable method of drying, in particular atomization or granulation-drying. It should be emphasized that when they are incorporated in the thermoplastic material, these agglomerates (within which the particles are simply bound by Van der Waals forces) disperse spontaneously during mixing and agitation and on account of the previous neutralization of the strong bonds likely to appear between particles.

According to a first embodiment, drying is carried out by atomization, preceded optionally by concentration in dry matter to obtain a dry matter weight substantially between 40% and 60% of the total weight.

According to another embodiment, drying is carried out by granulation-drying consisting first of all of forming agglomerates of particles and of heating them in order to extract part of the water in the form of steam, this granulation-drying being, optionally, preceded by concentration in dry matter in order to obtain a dry matter weight substantially between 50% and 90% of the total weight.

The invention extends to applications for the powder thus manufactured and in particular to applications thereof as a functional filler in a thermoplastic material with a view to increasing the modulus of elasticity in flexure for a given impact resistance.

Such applications make it possible in particular, by using talc as a starting mineral, to manufacture parts made of thermoplastic material based on polypropylene having bending moduli of elasticity greater by at least 15% than those of parts obtained by means of known comparable fillers. The process for manufacturing these parts is characterized in particular in that

- a talc powder treated according to the previously defined process is used as the functional filler,
- said talc powder is mixed with the thermoplastic material in the molten state, optionally with additives (stabilizer, pigment, slip agent, antistatic agent etc), so that the proportion by weight of talc is between 5% and 35% based on the thermoplastic material,
- a forming operation is carried out starting with the aforementioned mixture so as obtain a part having the desired shape and so as to orientate the talc particles along preferred directions.

The following specific conditions make it possible to manufacture thin interior parts of an automobile such as a dashboard, using a thermoplastic material based on polypropylene containing a minor proportion of elastomer:

- a talc powder according to the invention is used having a median particle size diameter $D_{50}$ substantially between 0.5 and 2.5 microns, a cutoff diameter $D_9$. of less than 8 microns, a cutoff diameter $D_{98}$ of less than 15 microns and a specific surface area (BET) substantially between 15 and 25 $m^2/g$,
- said talc powder is mixed with the thermoplastic material in the molten state so that the proportion of talc by weight lies substantially between 15% and 25% based on the thermoplastic material,
- a forming operation is carried out in a mold having parallel walls with a large surface area relative to the thickness of said mold, the material being injected under pressure through means of injection (nozzles or dies) capable of producing an orientation of the talc particles parallel to the large surface area walls of the mold.

A process of this type makes it possible in particular to manufacture parts made of thermoplastic material based on a copolymer of ethylene and propylene, wherein it contains a proportion of talc equal to 25% (±1%) based on the thermoplastic material, and wherein their modulus of elasticity in flexure is equal to 2,6000 megapascals (±5%), and its impact resistance is equal to 40 kilojoules/$m^2$ (±5%) (un-notched CHARPY resistance at −20° C.).

The following examples illustrate the treatment process according to the invention, the characteristics of the powders obtained and the performances to which these lead when they are used as functional fillers in thermoplastic materials.

EXAMPLE 1

Preparation of a Talc Powder According to the Invention

A. Suspension of the lamellar mineral

For the preparation of a suspension of talc, the following were introduced successively:

- 48 kg of water;
- 800 g of a dispersing agent of the "Polysel S (BASF)" type, i.e. 0.8–0.9% of a commercial solution based on the dry weight of talc;
- 32 kg of coarse lamellar material (talc) (particle size 0–100 μm) (coming from the Val Chisone mine in Italy).

This step enabled the talc to be wetted completely and a suspension to be obtained of which the viscosity was compatible with the grinding step.

B. Delamination of the lamellar talc

This operation was carried out by attrition using a grinder of the Alpine Discoplex 500 ADP type having a 10 litre grinding chamber. The grinder was coated with polyurethane in order to prevent the talc becoming grey through wear of the steel coating. A charge of balls with a volume of approximately 80% was introduced into the grinding chamber. The balls used were made of zirconium oxide ($Zr_2O_3$). The diameter of the balls was 1 mm. The talc suspension was fed into the grinder by a pump with an eccentric screw at a flow rate of 420 kg/h of pulp. Attrition was carried out on the batch at a speed of rotation of the central rotor of 380 revolutions/minute in a closed circuit for a period necessary to obtain the desired fineness (checked if necessary by laser diffraction) and corresponded to a consumed energy of 305 kw·h/t.

The temperature (T°<65° C.) and the viscosity of the suspension were checked during all the delamination operation and could be adjusted by adding dispersant to the suspension.

The product recovered was then analyzed by "Sedigraph" or laser diffraction in order to check delamination. The delamination step was carried out in a closed circuit enabling the energy introduced to be checked directly.

C. Selection of the delaminated product by a wet method

The hydrodynamic selection operation was carried out with the aid of an "Alpine AHP 200" turbine selector starting from the preceding wet ground suspension.

The suspension diluted to 14.3% dry extract was fed at a rate of 2700 1/hour, i.e. a dry talc feed rate of 425 kg/h. The selection speed of the turbine was adjusted to a speed of between 2700 and 3500 revolutions/minute and the rate of extraction of the rejects was adjusted with the aid of an eccentric screw pump between 180 and 270 1/hr in order to obtain the desired fineness of the particles.

The "fine" products selected were recovered with a yield of 60 to 80% by weight, corresponding to a consumed energy of between 5 and 50 kW·h/t. They were concentrated by centrifuging until a residual liquid/solid ratio was obtained close to 30 to 40%.

The products were characterized by particle size distribution, specific surface area (BET) and lamellarity index. Table 1 corresponds to the talc powders obtained according to the invention. Table 2, given by way of a control, corresponds to powders obtained by dry micronizing with the aid of a device of the "jet-mill" type corresponding to the prior art and coming from a lamellar talc mineral from the Val Chisone mine in Italy.

TABLE 1

| EXAMPLES | A | B | C |
|---|---|---|---|
| PROPERTIES OF THE TALC Particle size distribution: | | | |
| D95 (μm) | 5.2 | 6.2 | 5.4 |
| D50 (μm) | 1.3 | 1.6 | 1.1 |
| D98 (μm) | 6.8 | 8.1 | 6.5 |
| Specific surface area BET (m$^2$/g) | 19.0 | 16.5 | 20.5 |
| Lamellarity index | 10 | 9 | 9 |

TABLE 2

| EXAMPLES | D | E |
|---|---|---|
| PROPERTIES OF THE TALC Particle size distribution: | | |
| D95 (μm) | 10.0 | 8.0 |
| D50 (μm) | 3.8 | 3.1 |
| D98 (μm) | 12.0 | 10.0 |
| Specific surface area BET (m$^2$/g) | 7.0 | 10.0 |
| Lamellarity index | 1.5 | 2.5 |

D. Drying of the suspension

The "fine" products selected and concentrated were dried in a ventilated oven at a temperature of between 60 and 80° C. until a residual liquid/solid ratio was obtained of less than 0.5% by weight. Before complete drying, the talc was treated with an additive of the octylamine type, in a weight concentration of 0.3% based on the dry talc.

EXAMPLE 2

Application for the Powder as a Functional Filler in a Polypropylene

Mixing of a thermoplastic material based on a copolymer of ethylene and propylene, of the "PPT 1052 (Hoechst)" type and the talc powder prepared in the preceding example, was carried out in the molten state in a co-rotating twin screw extruder "Clextral BC21". With the proportion of talc introduced being equal to 25%, the compound was obtained at a rate of 3 kg/h, the sleeve being maintained at a temperature close to 200° C. and the speed of the twin screws being between 250 and 300 revolutions/minute.

The mixture, cut into the form of granules, was injected under an "ARBURG (305 ECO Allrounder)" press in a mold, giving specimens of the ISO 3167 type.

CHARPY impact and modulus in flexure measurements were carried out on these ISO specimens according to ISO standards 179 and 178 respectively.

A comparison between the performances of different polypropylene compounds was made, using as talcs:

Table 3: powders obtained according to the invention.

Table 4: as a control, powders obtained by dry micronizing with the aid of a device of the "jet-mill" type, corresponding to the prior art.

TABLE 3

| EXAMPLES | A | B | C |
|---|---|---|---|
| EXTRUSION OF THE PP/TALC MIXTURE | | | |
| Polypropylene (%) | 75 | 75 | 75 |
| Talc (%) | 25 | 25 | 25 |

TABLE 3-continued

| EXAMPLES | A | B | C |
|---|---|---|---|
| MECHANICAL PROPERTIES | | | |
| Modulus of elasticity in FLEXURE (MPa) | 2560 | 2530 | 2550 |
| CHARPY impact resistance 1 eU @ −20° C. (kj/m$^2$) | 42 | 38 | 40 |

TABLE 4

| EXAMPLES | D | E |
|---|---|---|
| EXTRUSION OF THE PP/TALC MIXTURE | | |
| Polypropylene (%) | 75 | 75 |
| Talc (%) | 25 | 25 |
| MECHANICAL PROPERTIES | | |
| Modulus of elasticity in FLEXURE (MPa) | 2200 | 2220 |
| CHARPY impact resistance 1 eU @ −20° C. (kj/m$^2$) | 41 | 42 |

A comparison of the results with the powders obtained according to the invention (examples A, B, C) and with powders corresponding to the prior art (examples D and E) showed an increase of 15% in the modulus of elasticity in flexure with the same impact resistance. Talcs D and E are talcs currently employed in industry with polypropylene compounds as having the best compromise between modulus of elasticity in flexure and impact resistance.

This increase of 15% in the modulus of elasticity in flexure of the material obtained makes it possible to reduce the dimensions of manufactured parts and results in practice in a reduction of 5% in the weight of the finished part for a given rigidity.

What is claimed is:

1. A process for treating a lamellar type mineral consisting of talc in the form of particles consisting of stacks of elementary leaves with a view to obtaining a functional filler for a polymeric material, which comprises:
    (a) suspending the mineral having an initial particle size with a median diameter $D_{50}$ greater than 5 microns in a liquid;
    (b) subjecting the suspension to a delamination operation so as to produce a separation of the leaves of the particles and so as to obtain a particle size less than the initial particle size;
    (c) then subjecting the suspension to a selection operation so as to eliminate the particles with a size greater than a predetermined size;
    (d) drying the suspension; and
    (e) treating the mineral particles so as to limit the creation of strong irreversible bonds between them.

2. The process according to claim 1, wherein the selection operation eliminates at least 98% of coarse particles having a diameter greater than 20 microns.

3. The process according to claim 1, wherein the mineral is suspended in water in the presence of a dispersing agent so that the weight of dry matter based on the total weight of the suspension lies substantially between 10% and 60%.

4. The process according to claim 1, wherein the delamination operation is carried out so as to obtain a median diameter $D_{50}$ of the particles substantially between 1 and 3.5 microns, and a specific surface area substantially between 15 and 40 m$^2$/g.

5. The process according to claim 1, wherein the suspension is dried so as to reach a residual liquid/solid ratio below 1%.

6. The process according to claim 1, wherein the drying is carried out by atomization, optionally preceded by concentration in dry matter so as to obtain a dry matter weight substantially between 40% and 60% of the total weight.

7. The process according to claim 1, wherein the drying is carried out by granulation-drying which comprises initially forming agglomerates of the particles and heating said agglomerates to extract part of the water in the form of steam; said granulation-drying being optionally preceded by a concentration in dry matter so as to obtain a dry matter weight substantially between 50% and 90% of the total weight.

8. The process according to claim 1, wherein a pre-ground macrocrystalline talc is used as the starting mineral.

9. The process according to claim 8, wherein the pre-ground talc has a median diameter $D_{50}$ greater than 10 microns.

10. A process for manufacturing a part made of thermoplastic material based on polypropylene, filled with a mineral powder, which comprises:
   using a talc powder treated in accordance with the process according to claim 1, and having a lamellarity index greater than 2.8;
   mixing said talc powder with the thermoplastic material in a molten state so as to obtain a mixture whose proportion of talc by weight lies between 5% and 35% based on the thermoplastic material; and
   carrying out a forming operation starting with the mixture so as to obtain a part with the desired shape and so as to orientate the talc particles along preferred directions.

11. The process according to claim 10 for manufacturing a thin interior part of an automobile using a thermoplastic material based on polypropylene containing a minor proportion of elastomer, wherein:
   the talc powder used has a median particle size diameter $D_{50}$ substantially between 0.5 and 2.5 microns, a cutoff diameter $D_{95}$ of less than 8 microns, a cutoff diameter $D_{98}$ of less than 15 microns, and a specific surface area (BET) substantially between 15 and 25 $m^2/g$;
   the proportion of talc by weight lies substantially between 15% and 25% based on the thermoplastic material; and
   the forming operation is carried out in a mold having parallel walls with a large surface area relative to the thickness of said mold; the material being injected under pressure through injection means capable of producing an orientation of the talc particles parallel to the large surface area walls of the mold.

12. A process for treating a lamellar type mineral consisting of talc in a divided state, with a view to obtaining a powder with a high lamellarity, which comprises:
   (a) suspending the mineral in the divided state in a liquid, the starting mineral having a median diameter $D_{50}$ greater than 5 microns;
   (b) subjecting said suspension to a delamination operation by grinding, by introducing a grinding charge into the suspension and by agitating the suspension until mineral particles are obtained having a median diameter $D_{50}$ substantially between 0.5 and 5 microns, and a specific surface area (BET) greater than 10 $m^2/g$;
   (c) then subjecting the suspension to a hydrodynamic selection so as to obtain a cutoff diameter $D_{95}$ less than 10 microns and a cutoff diameter $D_{98}$ less than 20 microns;
   (d) drying the suspension; and
   (e) treating the mineral particles so as to limit the creation of strong irreversible bonds between them.

13. The process according to claim 12, wherein the grinding operation is carried out by introducing into the suspension a charge of balls made of a harder material than the mineral; the volume of the balls being between 60% and 90% of the total volume of suspension and balls; the balls having a mean diameter substantially between 0.5 and 3 mm.

14. The process according to claim 13, wherein the grinding operation is carried out with a grinding energy substantially between 200 and 400 kilowatt·hour per ton.

15. The process according to claim 12, wherein the coarsest particles rejected during the hydrodynamic selection are recycled to a new grinding operation.

16. A process for treating a lamellar type mineral consisting of talc in the form of particles consisting of stacks of elementary leaves with a view to obtaining a functional filler for a polymeric material, which comprises:
   (a) suspending the mineral having an initial particle size with a median diameter $D_{50}$ greater than 5 microns in a liquid;
   (b) subjecting the suspension to a delamination operation so as to produce a separation of the leaves of the particles and so as to obtain a particle size less than the initial particle size;
   (c) then subjecting the suspension to a selection operation so as to eliminate the particles with a size greater than a predetermined size;
   (d) drying the suspension; and
   (e) treating the mineral particles before the suspension is completely dried by adding an additive capable of being adsorbed on the surface of the particles with a view to neutralizing their tendency to develop strong bonds.

17. The process according to claim 16, wherein the additive is added to the suspension after the selection operation, before or at the start of drying.

18. The process according to claim 16, wherein the additive comprises a compound with hydrophobic carbon chains bearing polar radicals.

19. The process according to claim 18, wherein the additive comprises a compound selected from the group consisting of amines, silanes, siloxanes, alcohols and acids.

20. The process according to claim 16, wherein the additive is added so that its weight based on the mineral weight lies substantially between 0.1% and 2%.

21. A talc powder having a specific surface area (BET) greater than 10 $m^2/g$, a particle size distribution such that the median diameter of the particles $D_{50}$ lies substantially between 0.5 and 5 microns, a cutoff diameter $D_{95}$ being less than 10 microns, a cutoff diameter $D_{98}$ being less than 20 microns, and wherein in combination with the particle size and specific surface area properties, said powder possesses a high lamellarity index greater than 2.8.

22. The talc powder according to claim 21, and being in a compacted state in the form of agglomerates of particles, capable of being redispersed in a liquid or viscous phase.

23. A part made of thermoplastic material based on a copolymer of ethylene and polypropylene, manufactured according to the process of claim 10, wherein said part contains a proportion of talc equal to 25% ±1% based on the thermoplastic material, a modulus of elasticity in flexure equal to 2,600 megapascals ±5%, and an impact resistance equal to 40 kilojoules/$m^2$ ±5% (un-notched CHARPY resistance at −20° C.).

* * * * *